US012799818B2

(12) United States Patent
Kajdasz et al.

(10) Patent No.: US 12,799,818 B2
(45) Date of Patent: Nov. 17, 2026

(54) GATE

(71) Applicant: Safe Rack LLC, Andrews, SC (US)

(72) Inventors: Stanley M. Kajdasz, Kingstree, SC (US); Janis Golubeckis, Georgetown, SC (US); Joseph N. Lane, Murrells, SC (US)

(73) Assignee: Safe Rack LLC, Andrews, SC (US)

( * ) Notice: Subject to any disclaimer, the term of this patent is extended or adjusted under 35 U.S.C. 154(b) by 0 days.

(21) Appl. No.: 19/084,251

(22) Filed: Mar. 19, 2025

(65) Prior Publication Data

US 2025/0297517 A1 Sep. 25, 2025

Related U.S. Application Data

(60) Provisional application No. 63/567,513, filed on Mar. 20, 2024.

(51) Int. Cl.
*E06B 11/02* (2006.01)
*E05D 3/02* (2006.01)
(Continued)

(52) U.S. Cl.
CPC ................ *E06B 11/02* (2013.01); *E05D 3/02* (2013.01); *E05F 1/1207* (2013.01); *E06B 11/04* (2013.01);
(Continued)

(58) Field of Classification Search
CPC . E06B 11/02; E06B 11/04; E06B 9/02; E06B 9/04; E06B 2009/002; E05F 1/1207; E05F 1/1215; E05D 3/02; E05Y 2900/40
See application file for complete search history.

(56) References Cited

U.S. PATENT DOCUMENTS

| | | | |
|---|---|---|---|
| 244,539 | A | 7/1881 | Boyden et al. |
| 765,372 | A | 7/1904 | Bading |

(Continued)

FOREIGN PATENT DOCUMENTS

| | | | |
|---|---|---|---|
| CN | 210768294 | U | 6/2020 |
| DE | 3428218 | A1 | 3/1985 |

(Continued)

OTHER PUBLICATIONS

International Search Report and Written Opinion, PCT/US2025/020683, dated Jun. 10, 2025, 11 pages.

(Continued)

*Primary Examiner* — Justin B Rephann
(74) *Attorney, Agent, or Firm* — Nelson Mullins Riley & Scarborough LLP

(57) ABSTRACT

A gate apparatus comprising a mounting structure and at least one hinge. The hinge has a first pivoting part, a second pivoting part, and a spring element, the first pivoting part being attachable to the mounting structure. A swingable structure is attachable to the second pivoting part of the hinge. The first and second pivoting parts define an internal space in which the spring is received so as to be entirely enclosed, the internal space being formed by opposed recesses defined in the pivoting parts. In addition, the internal space is configured to allow the spring element to be seated in the internal space in a selected one of a first orientation and a second orientation allowing the first pivoting part and the second pivoting part of the at least one hinge to be aligned or perpendicular when the swingable structure is in a closed position.

23 Claims, 12 Drawing Sheets

(51) Int. Cl.
*E05F 1/12* (2006.01)
*E06B 11/04* (2006.01)
*E06B 9/00* (2006.01)

(52) U.S. Cl.
CPC ..... *E05Y 2900/40* (2013.01); *E06B 2009/002* (2013.01)

(56) References Cited

U.S. PATENT DOCUMENTS 922,544 A 5/1909 Turner et al.
962,330 A 6/1910 Fisher
1,236,536 A 8/1917 Boyd
1,540,490 A 6/1925 Mertel
1,611,238 A 12/1926 Sanborn
1,933,244 A 10/1933 Denny
2,218,581 A 10/1940 Levan
2,503,997 A 4/1950 Leo
2,574,807 A 11/1951 Woodruff
2,923,323 A 2/1960 Franck
3,222,805 A 12/1965 Hansen
3,381,567 A 5/1968 Askey
3,510,986 A 5/1970 Berkowitz
3,674,294 A 7/1972 Kirkham
3,866,356 A 2/1975 La Cook et al.
3,993,103 A 11/1976 Hammer
4,122,630 A 10/1978 Parisien
4,134,703 A 1/1979 Hinners
4,165,109 A 8/1979 Foti
4,261,600 A 4/1981 Cassel
4,294,560 A 10/1981 Larkin
4,303,101 A 12/1981 Tholen
4,434,578 A 3/1984 Rumpz
4,465,262 A 8/1984 Itri et al.
4,472,908 A 9/1984 Wanzl et al.
4,480,860 A 11/1984 Foresta et al.
4,519,164 A 5/1985 Porter
4,531,550 A 7/1985 Gartner
4,592,687 A 6/1986 Piersall
4,611,431 A 9/1986 Lauro
4,658,543 A 4/1987 Carr
4,671,541 A 6/1987 Webb et al.
4,844,653 A 7/1989 Dickinson
5,022,185 A 6/1991 Oatman
5,056,833 A 10/1991 Webb et al.
5,117,585 A 6/1992 Andrisin, III
5,119,861 A 6/1992 Pino
5,136,810 A 8/1992 DeWitt, III
5,190,393 A 3/1993 Svensson
5,224,516 A 7/1993 McGovern et al.
5,272,840 A 12/1993 Knoedler et al.
5,299,386 A 4/1994 Naegelli et al.
5,440,838 A 8/1995 Lesser
5,575,113 A 11/1996 Huang
5,584,100 A 12/1996 Doyle et al.
5,606,773 A 3/1997 Shappell
5,657,809 A * 8/1997 Longoria .................. E06B 9/04
160/369
5,692,856 A 12/1997 Newman, Jr. et al.
5,704,164 A 1/1998 Huang
5,921,027 A 7/1999 Siebenahler
5,984,569 A 11/1999 Chou
5,992,278 A 11/1999 Rimlinger, Jr.
5,997,211 A 12/1999 Chou
6,056,038 A 5/2000 Foster et al.
6,073,396 A 6/2000 Kietzmann
6,094,863 A 8/2000 LaCook, Jr.
6,112,460 A 9/2000 Wagnitz
6,115,963 A 9/2000 Allardyce et al.
6,119,399 A 9/2000 McCain et al.
6,233,874 B1 5/2001 Johnson, Jr.
6,256,839 B1 7/2001 Wu
6,293,556 B1 9/2001 Krausz
6,378,560 B1 4/2002 Ferrer
6,474,021 B2 11/2002 Homeyer
6,477,736 B1 11/2002 Abernathy
6,618,902 B2 9/2003 Wu
D485,911 S 1/2004 Learning et al.
6,684,566 B2 2/2004 LaCook
6,796,004 B2 9/2004 Belisle et al.
6,796,084 B2 9/2004 Gagnon
7,000,673 B2 2/2006 Cook
7,052,052 B2 5/2006 Protas et al.
7,210,199 B2 5/2007 Clark
7,334,624 B2 2/2008 Waldman et al.
7,384,017 B1 6/2008 Burke et al.
7,422,048 B2 9/2008 Andersen
7,658,220 B2 2/2010 Yates
7,950,095 B2 5/2011 Honeycutt
8,046,858 B2 11/2011 Honeycutt
8,261,393 B2 9/2012 Honeycutt et al.
8,282,318 B2 10/2012 Robertson, Jr.
8,297,336 B2 10/2012 Yates
8,341,821 B2 1/2013 Honeycutt
8,418,407 B2 4/2013 Wang
8,561,349 B2 10/2013 Flannery et al.
8,578,656 B2 11/2013 Yates et al.
8,714,883 B2 5/2014 Rataj
8,898,957 B2 * 12/2014 Morrone, III ......... E05C 19/003
49/55
8,991,009 B1 3/2015 Russo et al.
9,032,666 B2 5/2015 Honeycutt et al.
9,038,313 B2 * 5/2015 Morrone, III ......... E05C 19/003
49/55
9,476,239 B2 * 10/2016 Honeycutt ................ E05F 1/12
9,719,299 B2 * 8/2017 Honeycutt ................ E05F 1/12
9,803,408 B2 10/2017 Timothy
10,208,440 B1 2/2019 Honeycutt
10,253,538 B2 4/2019 Honeycutt et al.
10,626,651 B2 4/2020 Chang
10,689,816 B1 6/2020 Honeycutt
11,174,675 B1 * 11/2021 Flannery ................... E06B 9/06
11,371,281 B2 * 6/2022 Zutler ....................... E06B 9/04
11,649,669 B1 * 5/2023 Flannery ............... E06B 9/0692
49/55
11,767,694 B2 9/2023 Naganuma
11,873,680 B2 1/2024 Satrom et al.
12,037,836 B2 * 7/2024 Letvin ....................... E05F 3/14
12,163,374 B1 * 12/2024 Flannery ................... E06B 9/06
2003/0019158 A1 1/2003 Gagnon
2003/0159356 A1 8/2003 Russell
2003/0230328 A1 12/2003 Chen
2005/0028947 A1 2/2005 Waldman et al.
2005/0060936 A1 3/2005 Burke
2005/0066476 A1 * 3/2005 Van Parys ............. E05D 5/0238
16/342
2005/0099003 A1 5/2005 Tarara
2005/0141954 A1 6/2005 Mieger et al.
2005/0207829 A1 9/2005 Lenhart
2005/0220917 A1 10/2005 Pierik et al.
2006/0228177 A1 10/2006 Allain et al.
2007/0051934 A1 3/2007 LaCook
2007/0089273 A1 4/2007 Kang
2007/0113378 A1 5/2007 Talpe
2007/0144691 A1 6/2007 Yates
2008/0000156 A1 1/2008 Stoffels et al.
2008/0038055 A1 2/2008 Jankovsky
2008/0244983 A1 10/2008 Peterson
2008/0256865 A1 10/2008 Trujillo et al.
2009/0071074 A1 3/2009 Yates
2009/0158665 A1 6/2009 Wu
2009/0217591 A1 9/2009 LaCook
2009/0241610 A1 10/2009 Watts et al.
2010/0031455 A1 2/2010 Honeycutt et al.
2010/0083577 A1 4/2010 Flannery et al.
2010/0316438 A1 12/2010 Sohn
2010/0319260 A1 12/2010 Sawa
2011/0072618 A1 3/2011 Chen
2011/0258834 A1 10/2011 Allen et al.
2011/0302743 A1 12/2011 Kim et al.
2012/0011774 A1 1/2012 Arnaud
2012/0017393 A1 1/2012 Pate, Jr.
2012/0056144 A1 3/2012 Woods et al.
2013/0045041 A1 2/2013 Sohn
2013/0071182 A1 3/2013 Younce et al.

(56) References Cited

U.S. PATENT DOCUMENTS

| | | | |
|---|---|---|---|
| 2013/0086842 | A1 | 4/2013 | Morrone, III |
| 2013/0097806 | A1 | 4/2013 | Pate, Jr. |
| 2013/0219790 | A1 | 8/2013 | Honeycutt et al. |
| 2014/0068894 | A1 | 3/2014 | Nagl et al. |
| 2014/0360680 | A1 | 12/2014 | Burgin |
| 2015/0047265 | A1* | 2/2015 | Morrone, III ......... E06B 9/0653 292/259 R |
| 2015/0330142 | A1* | 11/2015 | Pilgrim ..................... E05D 3/02 160/374 |
| 2016/0002870 | A1 | 1/2016 | Younce et al. |
| 2017/0198448 | A1 | 7/2017 | Han |
| 2018/0044984 | A1 | 2/2018 | Honeycutt et al. |
| 2018/0274288 | A1* | 9/2018 | Wang ........................ E06B 9/04 |
| 2020/0370370 | A1* | 11/2020 | Satrom ................. E05F 1/1215 |
| 2024/0076932 | A1 | 3/2024 | Satrom et al. |

FOREIGN PATENT DOCUMENTS

| | | | |
|---|---|---|---|
| EP | 1640503 | A1 | 3/2006 |
| FR | 2814511 | A1 | 3/2002 |
| FR | 2886656 | A1 | 12/2006 |
| GB | 2404413 | A | 2/2005 |
| JP | H05239981 | A | 9/1993 |
| WO | 2011/127533 | A1 | 10/2011 |

OTHER PUBLICATIONS

"YellowGate XL" sales sheet, created May 2015, all enclosed pages cited.

Extended European Search Report dated Sep. 17, 2015 in corresponding European patent application No. 13749657.6, all enclosed pages cited.

File History of U.S. Appl. No. 61/366,612, filed Jul. 22, 2010, entitled "Gangway Bearing Retainer Plate," all enclosed pages cited.

File History of U.S. Appl. No. 61/374,541, filed Aug. 17, 2010, entitled "Articulating Cage," all enclosed pages cited.

International Search Report & Written Opinion dated May 6, 2013 for corresponding PCT application serial No. PCT/US2013/026306.

Owner's Manual "Yellow Gate," www.yellowgate.com, Doc. No. YG-2011, all enclosed pages cited.

U.S. Appl. No. 12/837,480, filed Jul. 15, 2010 entitled "Mobile Access Unit and Cage," all enclosed pages cited.

* cited by examiner

GATE

CROSS-REFERENCE TO RELATED APPLICATION

This application is based upon and claims priority to U.S. Provisional Patent Application No. 63/567,513 filed Mar. 20, 2024, which is incorporated herein in its entirety for all purposes.

FIELD OF THE INVENTION

Embodiments of the present invention relate to a swing gate.

BACKGROUND OF THE INVENTION

Typically, a railing structure utilized to separate one area from another will have gaps through which a person can pass. For example, an elevated platform may have a railing around its perimeter to prevent falls from the platform. A pivotal gate may be used so that the gap is normally closed. A person wishing to walk through the gap must first open the gate.

An example of a prior art gate is shown and described in U.S. Pat. No. 10,253,538, incorporated fully herein by reference for all purposes.

SUMMARY OF THE INVENTION

The present invention recognizes and addresses the foregoing considerations, and others, of prior art construction and methods.

In this regard, one aspect of the present invention provides a gate apparatus comprising a mounting structure and at least one hinge. The hinge has a first pivoting part, a second pivoting part, and a spring element, the first pivoting part being attachable to the mounting structure. A swingable structure is attachable to the second pivoting part of the at least one hinge. The first pivoting part and the second pivoting part define an internal space in which the spring element is received so as to be entirely enclosed, the internal space being formed by opposed recesses defined in the first pivoting part and the second pivoting part. In addition, the internal space is configured to allow the spring element to be seated in the internal space in a selected one of a first orientation and a second orientation allowing the first pivoting part and the second pivoting part of the hinge to be aligned or perpendicular when the swingable structure is in a closed position.

In some exemplary embodiments, the spring element may comprise at least one torsion spring having first and second end portions. At least one of the recesses may define first and second tangential slots to alternatively receive one of the end portions in the first orientation and the second orientation, respectively.

In some exemplary embodiments, the gate apparatus may comprise first and second hinges. The swingable structure in such embodiments may comprise first and second arms attached to the first and second hinges, respectively. For example, the first and second arms may each have a tubular configuration. A vertical element may extend between the first and second arms. The first and second arms may each comprise a proximal arm element and a distal arm element telescopically received in the proximal arm element. The swingable structure may be configured to have an adjustable width. Moreover, the distal arm elements may be portions of a U-shaped arm structure.

Another aspect of the present invention provides a gate apparatus comprising a mounting structure and at least one hinge attachable to the mounting structure. A swingable structure is attachable to the at least one hinge via a respective expandible clamping mechanism, the swingable structure having at least one tubular arm.

In some exemplary embodiments, the expandible clamping mechanism may include a split ring engaging a frustoconical portion of the at least one hinge. The expandible clamping mechanism in such embodiments may further comprise a jack screw and a disc engaging the split ring, wherein tightening of the jack screw causes expansion of the split ring.

A further aspect of the present invention provides a gate apparatus comprising a mounting structure and at least one hinge attachable to the mounting structure. A swingable structure is attachable to the at least one hinge. The swingable structure has at least one tubular arm having a proximal arm element and a distal arm element telescopically received in the proximal arm element, the distal arm element being slidable with respect to the proximal arm element to adjust a width of the swingable structure. A clamp configured to maintain the swingable structure at a selected width is also provided. The clamp in this aspect has a first axial portion of greater inner diameter for engaging the proximal arm element and a second axial portion of lesser inner diameter to engage the distal arm element.

In some exemplary embodiments, the clamp may define an axial gap between the first axial portion and the second axial portion. Each of the first axial portion and the second axial portion may have a pair of opposed tabs defining aligned holes therethrough for receipt of a respective bolt.

The accompanying drawings, which are incorporated in and constitute a part of this specification, illustrate one or more embodiments of the present invention.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Figure 1:
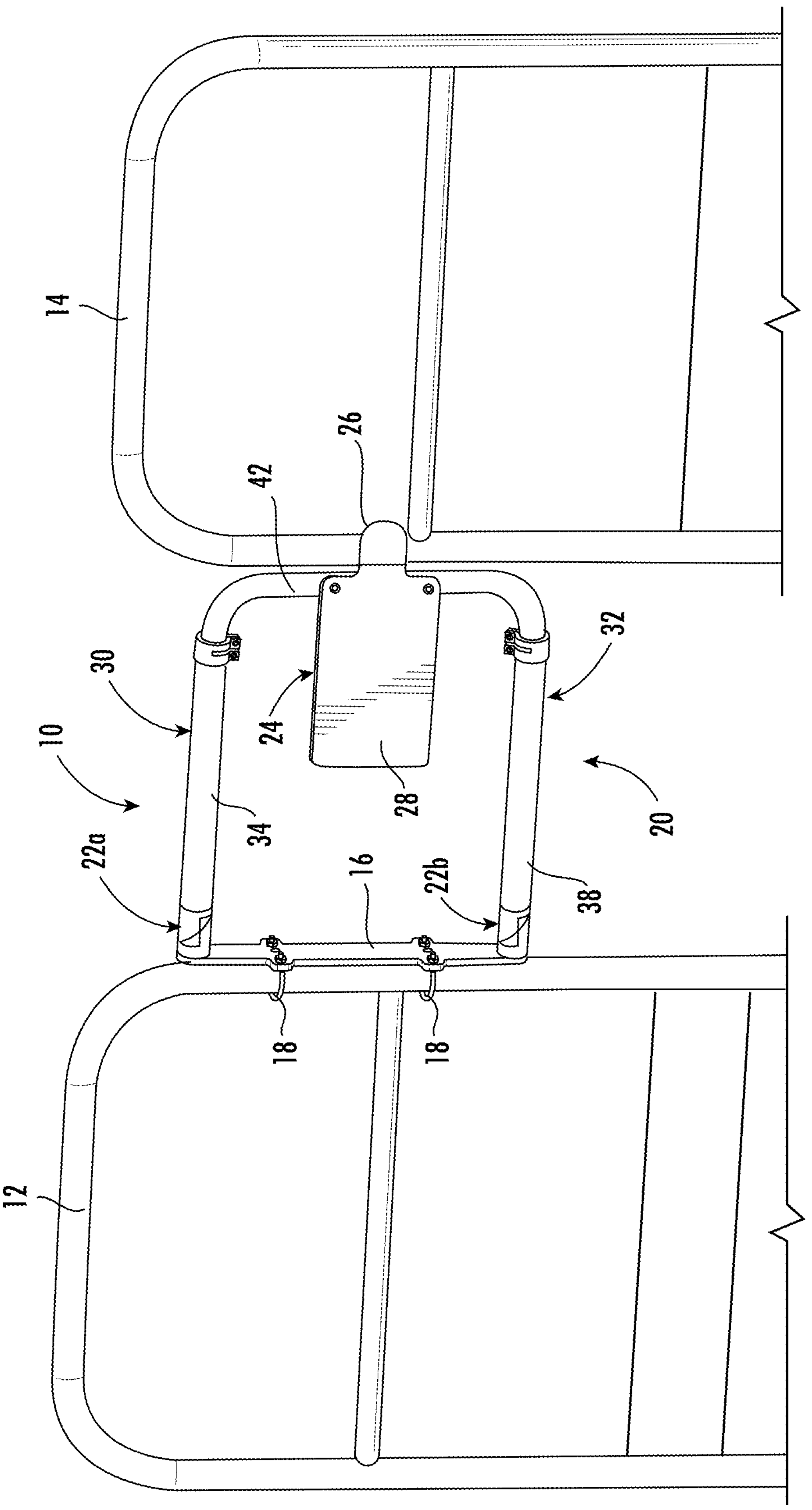
FIG. 1 is a perspective view showing a gate apparatus in accordance with an embodiment of the present invention installed in a railing gap in a first mounting configuration.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

FIG. 1 illustrates a gate apparatus (or simply "gate") 10 in accordance with an embodiment of the present invention. As shown, gate 10 is mounted in an opening (or "gap") of a rail structure or the like, such as the railing of a walkway or platform. In the illustrated embodiment, the opening is formed between a pair of spaced apart railing elements 12 and 14. Specifically, gate 10 includes a mounting structure 16 that is attached to railing element 12, such as via U-bolts 18 or any other suitable means of attachment. Mounting structure 16, in this embodiment, comprises a single elongate plate although embodiments are contemplated in which mounting structure 16 comprises more than one element that collectively allow attachment of other portions of gate 10 to a fixed structure. A swingable structure 20 is pivotally connected to the mounting structure 16. In this case, mounting structure 16 is attached to upright 12 in line with swingable structure 20 (in its closed position as illustrated).

Swingable structure 20 pivots about a plurality of hinges 22. (In this case, a pair of hinges 22 are provided, respectively designated 22*a* and 22*b*.) As will be explained more fully below, at least one, and preferably at least two, of the hinges 22 includes an internal spring that functions to urge the swingable structure 20 into a closed position. A striker is attached to the swingable structure 20 to retain gate 10 normally in the closed position. To open the gate 10, a user pivots swingable structure 20 so that the striker is moved away from the railing element 14. In this case, the striker is formed by a plate 24 having a striker portion 26 and an integral sign portion 28. Sign portion 28 may be used to display informational messages to users, as necessary or desired.

Figure 3:
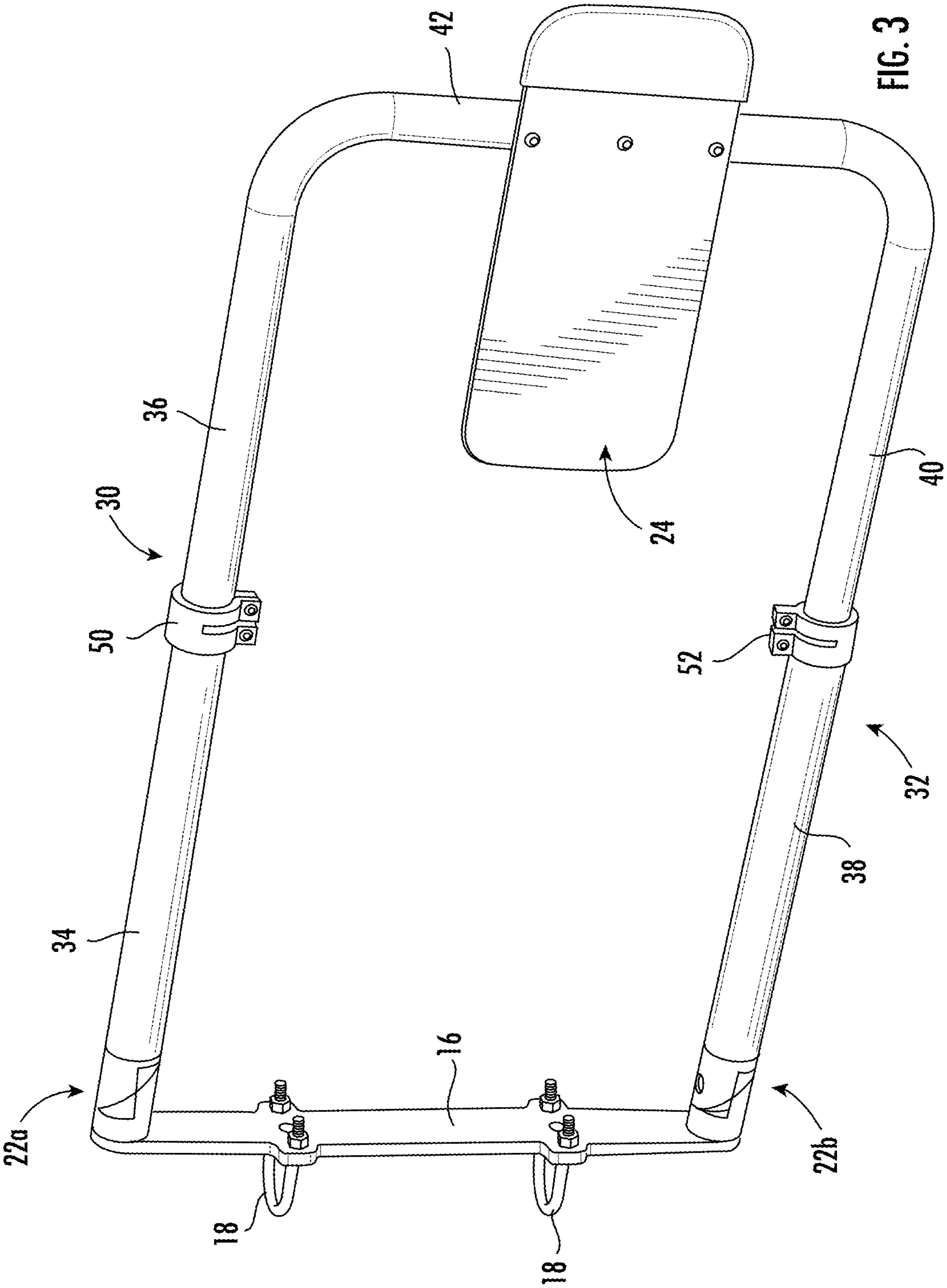
FIG. 3 is a front perspective view of a gate apparatus similar to the embodiment of FIG. 1.
Figure 4:
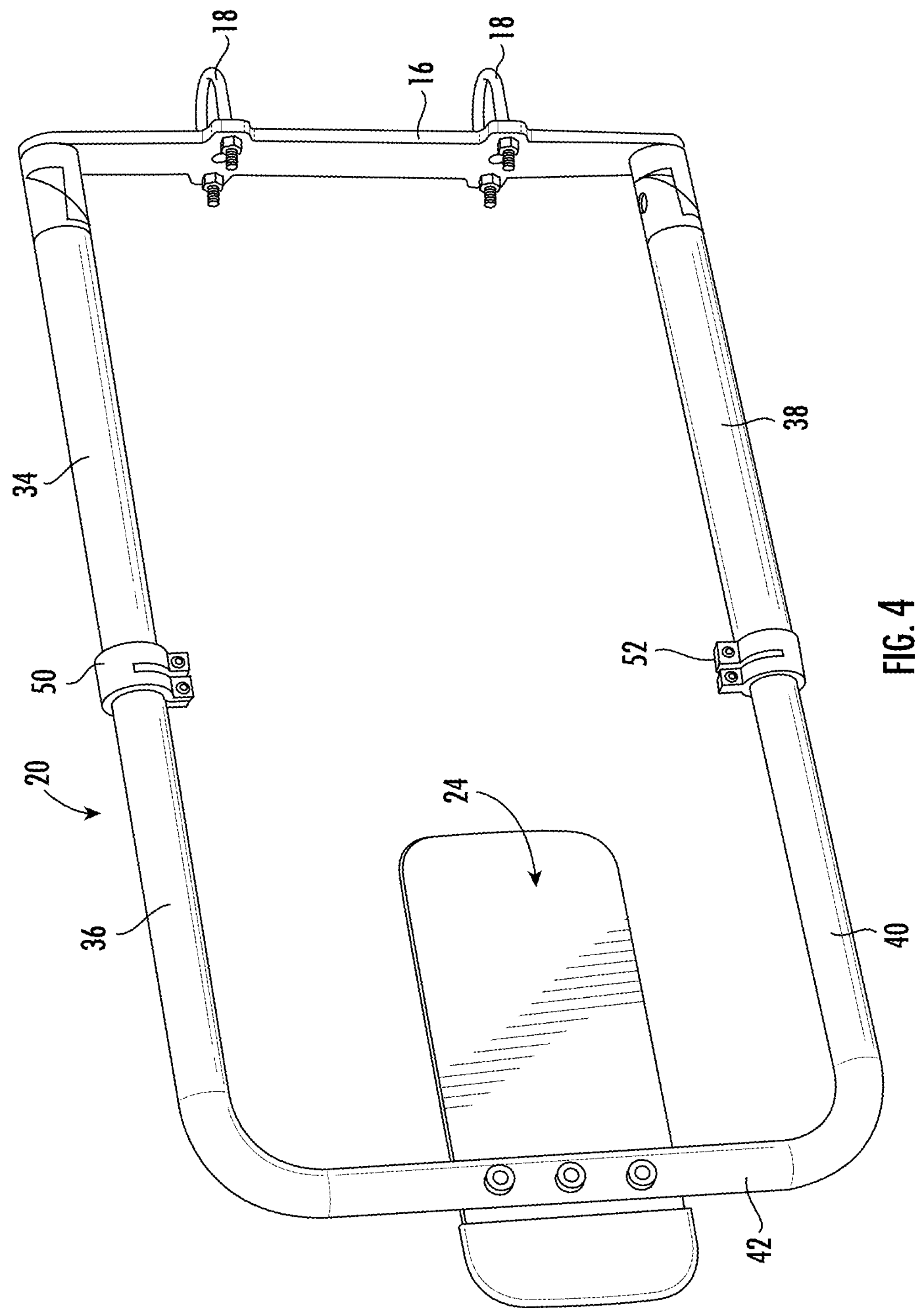
FIG. 4 is a back perspective view of the gate apparatus of FIG. 3.

Referring now also to FIG. 3, swingable structure 20 has upper and lower arms 30 and 32. In this embodiment, upper arm 30 has a proximal arm element 34 and a distal arm element 36. Similarly, lower arm 32 has a proximal arm element 38 and a distal arm element 40. As will be explained more fully below, distal arm elements 36 and 40 are telescopically movable with respect to proximal arm elements 34 and 38 in order to adjust the width of gate 10. In this embodiment, distal arm elements 36 and 40 are portions of a U-shaped member also having a vertical element 42 that interconnects distal ends of distal arm elements 36 and 40. (Plate 24 has a slightly different configuration in FIGS. 3 and 4 than in various other figures but is functionally the same.)

Figure 2A:
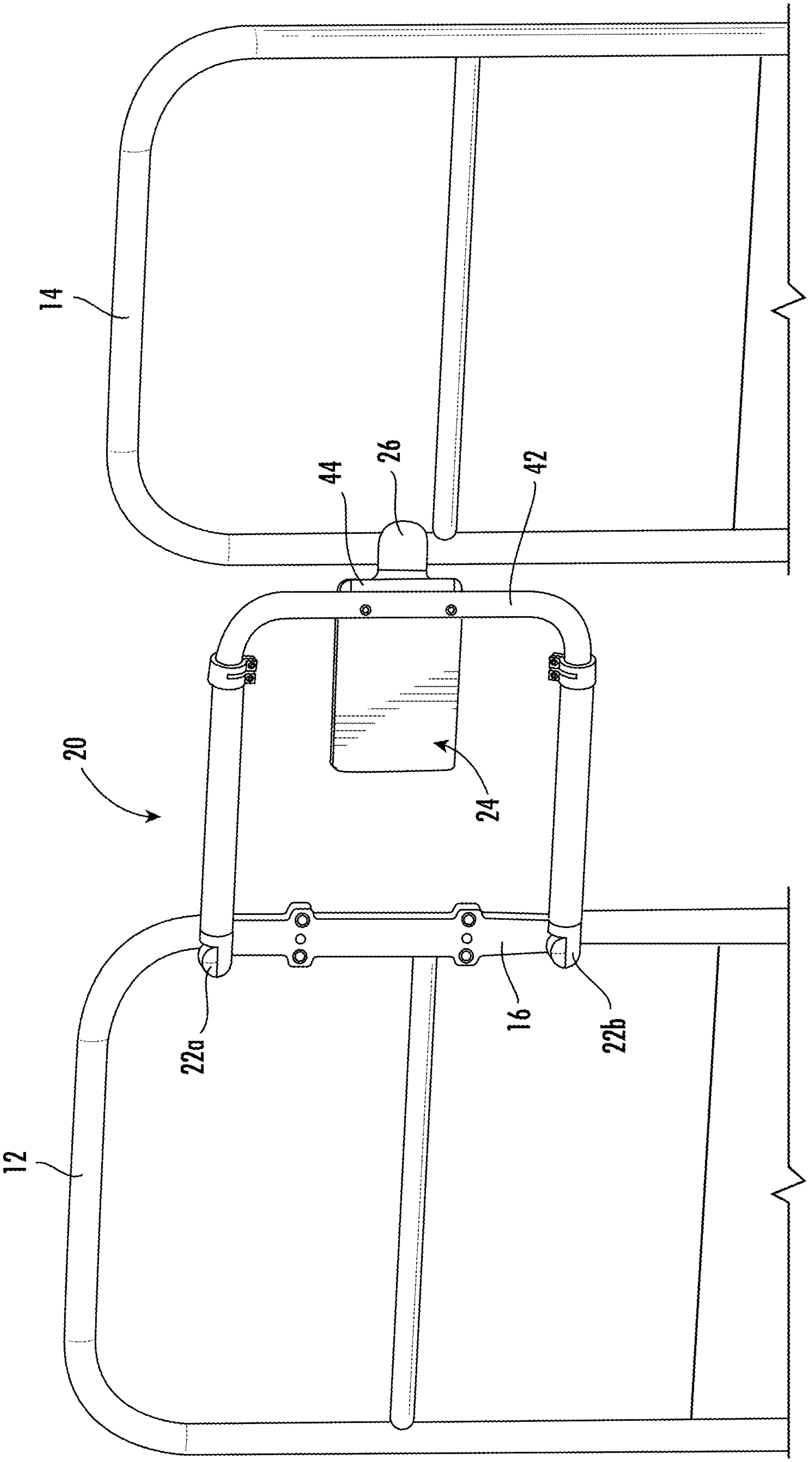
FIG. 2A is a perspective view similar to FIG. 1 but showing the gate apparatus installed in a second mounting configuration.
Figure 2B:
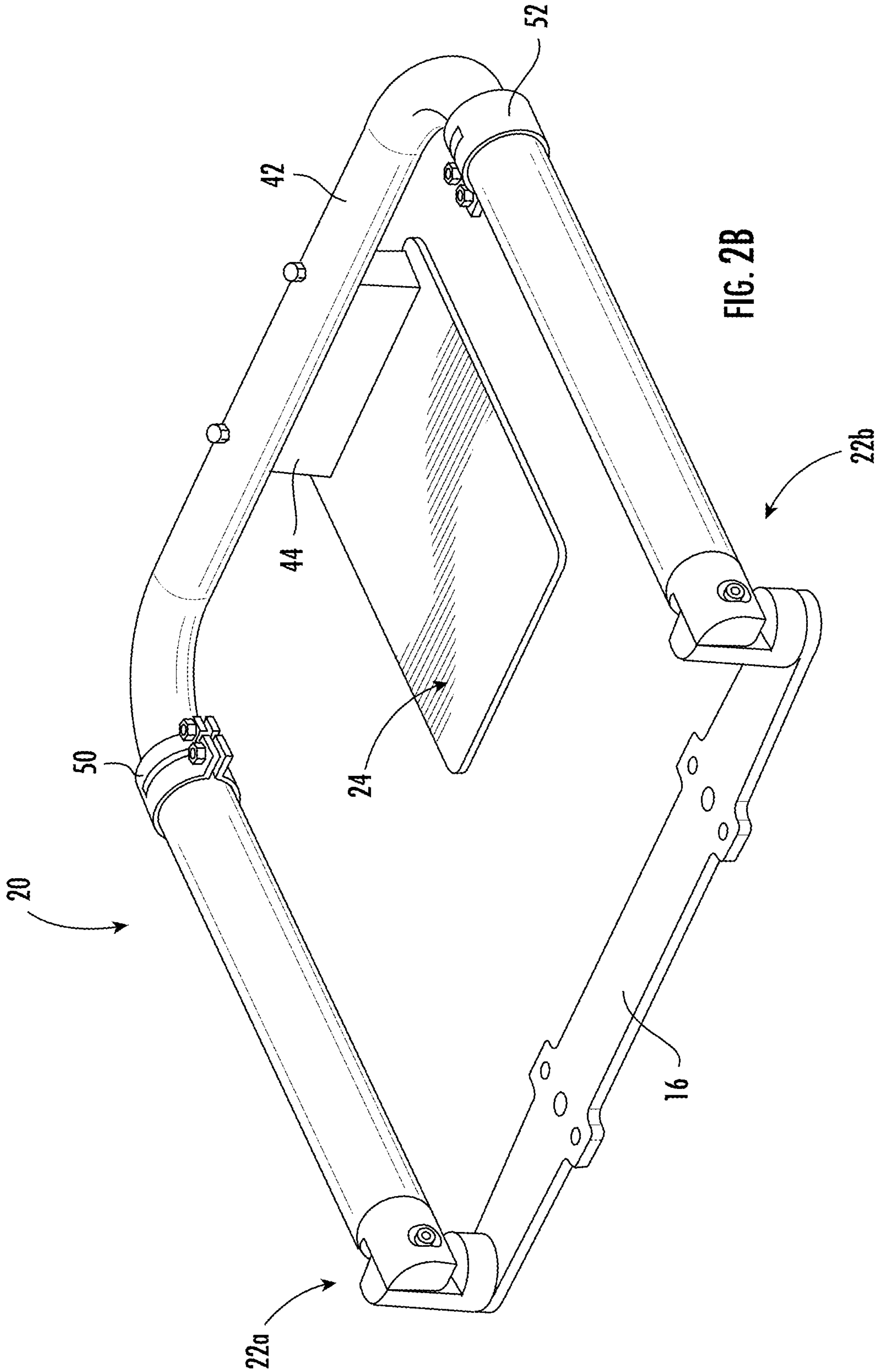
FIG. 2B is a perspective view of a gate apparatus according to an embodiment of the present invention in the second mounting configuration of FIG. 2A.

In FIGS. 2A and 2B, gate 10 is slightly modified so that mounting structure 16 is perpendicular to swingable structure 20 in the closed position. This mounting configuration may be used, for example, if the width of the gap between railing structures 12 and 14 is too small to accommodate gate 10. In this case, it can be seen that the pivoting parts of hinges 22*a* and 22*b* are perpendicular to each other, rather than being aligned in the closed position as in FIG. 1. A preferred manner in which hinges 22 are adapted so that the pivoting parts are perpendicular when gate 10 is in the closed position will be described more fully below. In addition, it can be seen that plate 24 is attached to the back side of vertical element 42 rather than being on the front side as in the arrangement shown in FIG. 1. Moreover, a spacer 44 between plate 24 and vertical element 42 may be sized so that the spacing is greater in this arrangement than in the arrangement of FIG. 1. (In other words, a different spacer is used in the arrangement of FIG. 1 that yields less space between plate 24 and vertical element 42.) Because vertical element 42 has a tubular cross-section in this embodiment, it will be appreciated that the two sides of spacer element 44 will be concave and flat, respectively.

Referring now to FIGS. 3 through 6, proximal arm element 34 in this embodiment has a tubular configuration in which a proximal end of distal arm element 36 is slidably received. Similarly, proximal arm element 38 has a tubular configuration in which a proximal end of distal arm element 40 is slidably received. Hinges 22*a* and 22*b* are connected between the respective proximal ends of proximal arm elements 34 and 38 and mounting structure 16. Specifically, the outer diameter of distal arm elements 36 and 40 is preferably selected to be just small enough to fit snugly within the inner diameter of proximal arm elements 34 and 38. Distal arm elements 36 and 40 may be fitted with a respective end piece 46 and 48, e.g., a respective cap element that may be formed of a suitable polymeric material such as nylon or ultra-high molecular weight polyethylene, to facilitate the sliding movement of distal arm elements 36 and 40 with respect to proximal arm elements 34 and 38.

Figure 5:
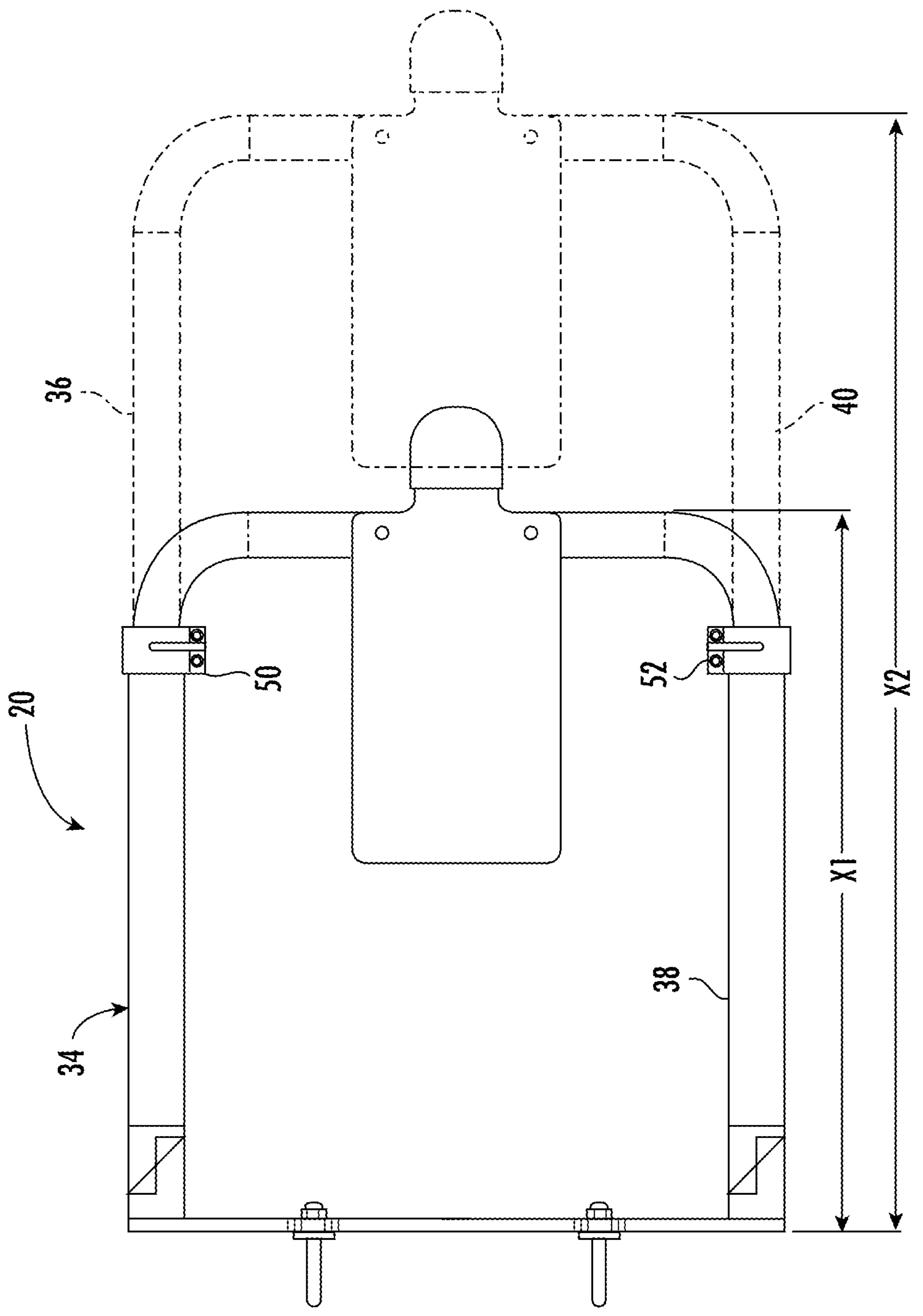
FIG. 5 is a diagrammatic elevation of the gate apparatus of FIG. 1 showing telescopic width adjustment.
Figure 6:
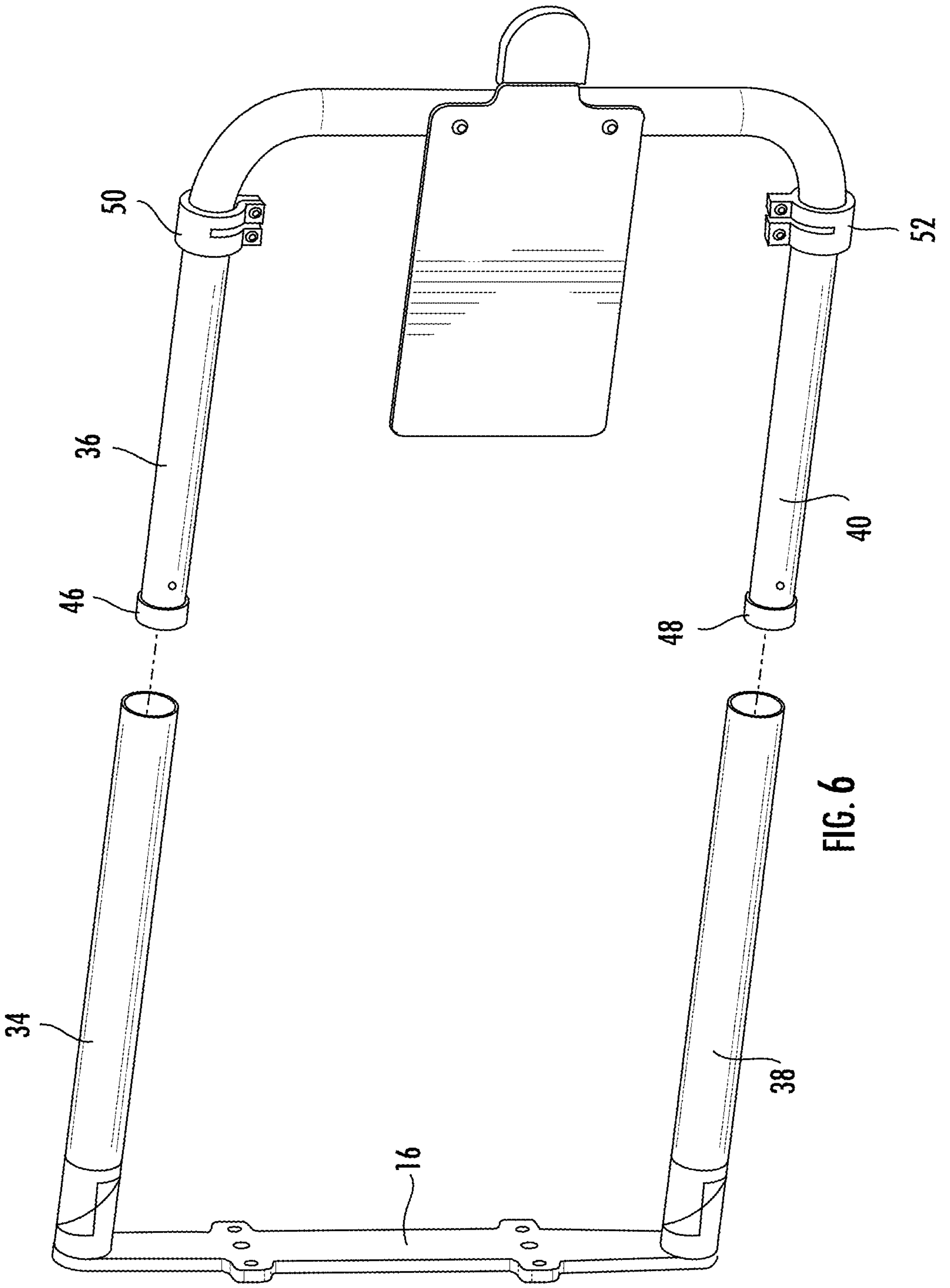
FIG. 6 is a perspective view of the gate apparatus of FIG. 1 with telescopic tubular arm elements separated.
Figure 7:
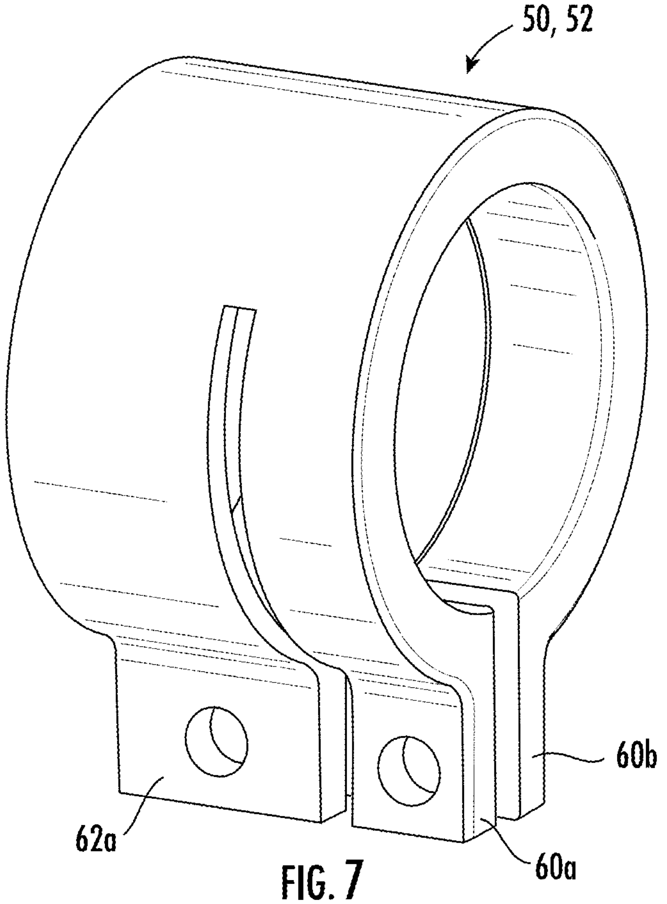
FIG. 7 is a perspective view showing a clamp that may be used to fix a selected width of the gate apparatus.
Figure 8:
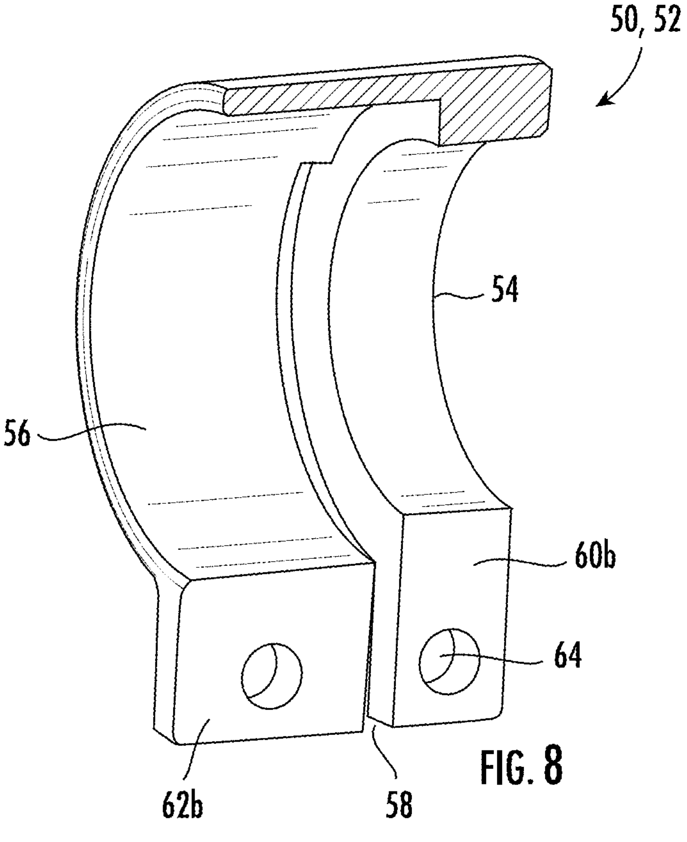
FIG. 8 is a cross-sectional view of the clamp of FIG. 7.
Figure 9:
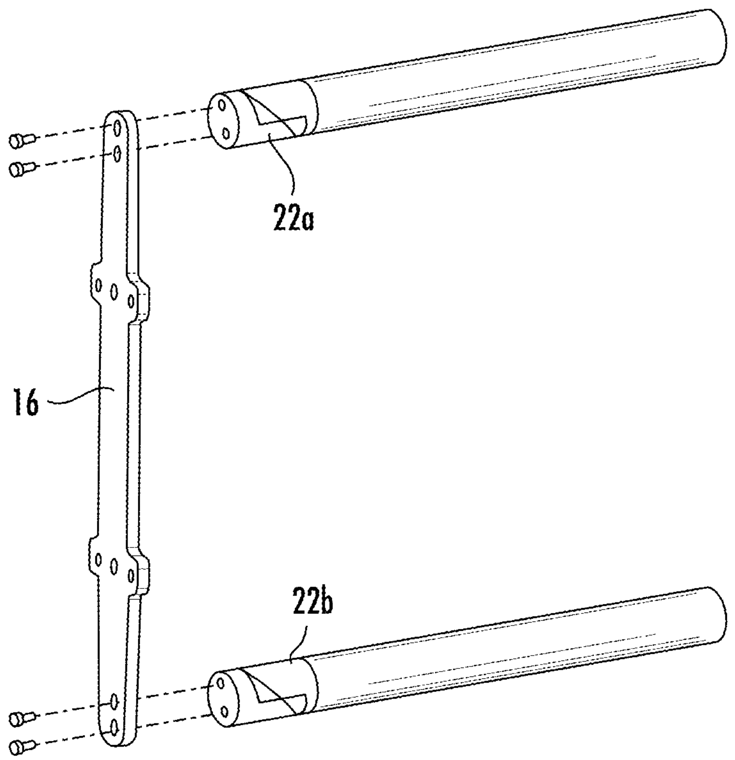
FIG. 9 Is an exploded perspective view showing attachment of hinges of the gate apparatus to a mounting structure.

Referring now specifically to FIG. 5, the width of swingable structure 20 is continuously adjustable between limits X1 and X2. During such adjustment, clamps 50 and 52, which are used to maintain the desired width, are loosened. When the desired width is achieved, clamps 50 and 52 are tightened. As shown in FIGS. 7 and 8, clamps 50, 52 in this embodiment have a first axial portion 54 with a lesser inner diameter and a second axial portion 56 with a greater inner diameter. It will be appreciated that portion 54 is adapted to engage the outer surface of distal arm elements 36, 40 while portion 56 is adapted to engage the outer surface of proximal arm elements 34, 38. Portions 54 and 56 are separated by an axial gap 58 that extends partially around the annulus of the associated arm. As a result, portions 54 and 56 are rendered slightly flexible and can be tightened independently of each other. Portions 54 and 56 terminate with opposed tabs 60*a-b* and 62*a-b*, respectively. The opposed tabs define aligned holes, e.g., hole 64, for receipt of a bolt. Tightening the bolt via an associated nut tightens the corresponding one of portions 54 or 56.

Certain additional details can be most easily explained with reference to FIGS. 9 through 12. As can be seen, hinge 22 includes a first pivoting part 66 attached to mounting structure 16 such as via one or more screws (see FIG. 9). Hinge 22 further includes a second pivoting part 68 that rotates with respect to first pivoting part 66. In this regard, a hinge pin (or axle) 70 extends between pivoting parts 66 and 68 to allow the pivoting movement. Hinge pin 70 may take any suitable configuration, such as a bolt-like structure having a smooth shank portion with a distal portion that is attached to hinge part 66 (such as by threads, etc.). As will be explained below, a suitable spring element 72, here embodied as a torsion spring mounted coaxial to hinge pin 70, may be located in a configured space defined between pivoting parts 66 and 68. As a result, spring element 72 will be entirely enclosed within the hinge. In some embodiments, the hinge pin 70 may extend through a bushing 74 mounted in the axial bore formed by the coil of spring element 72. A flat washer 76 may also be mounted between pivoting parts 66 and 68 to facilitate smooth operation of the hinge 22 and/or to reduce wear, as necessary or desired.

Figure 10:
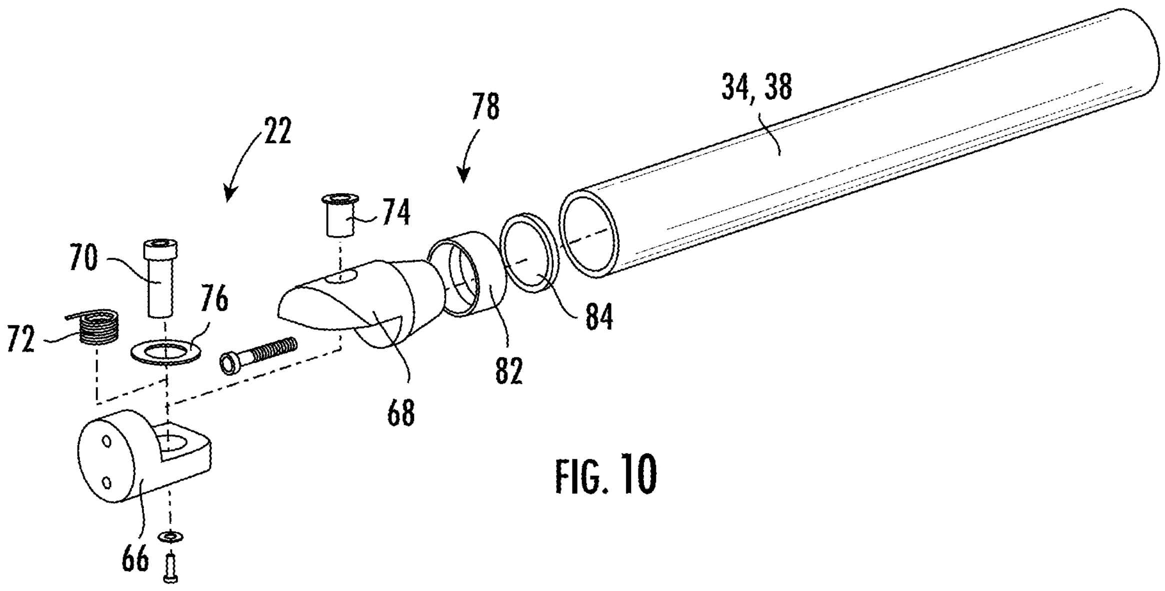
FIG. 10 is an exploded perspective view of a hinge and tubular arm.
Figure 11:
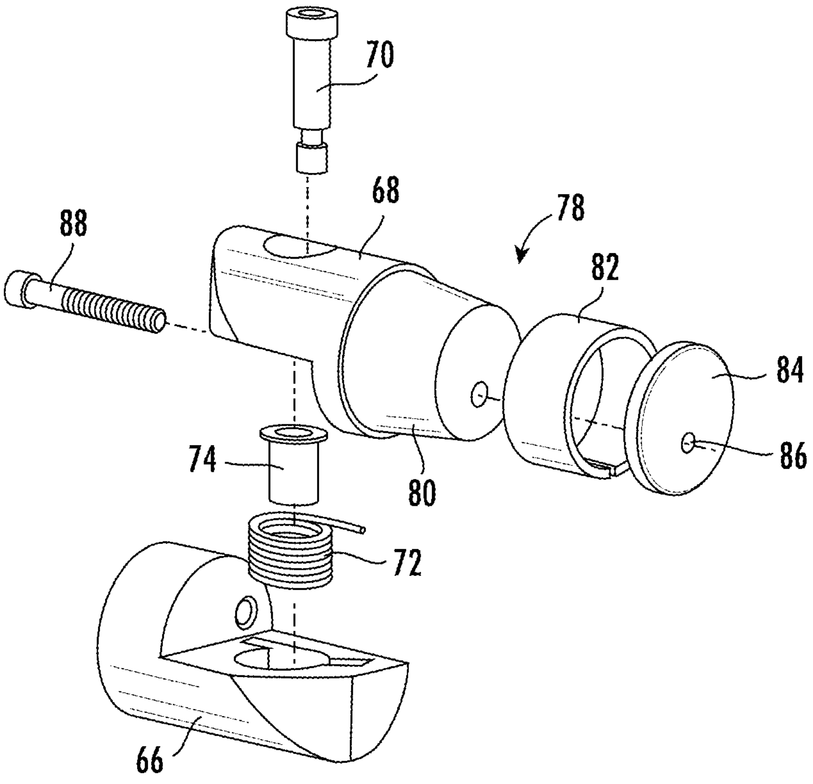
FIGS. 11 and 12 are top and bottom exploded perspective views, respectively, of the hinge and arm clamping mechanism.
Figure 12:
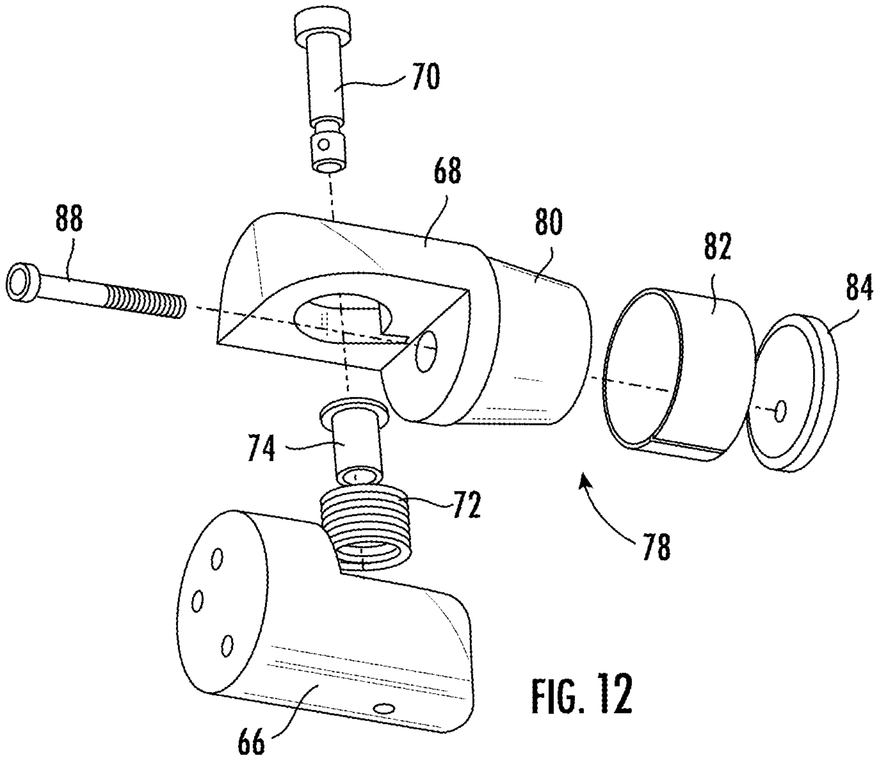
Figure 13:
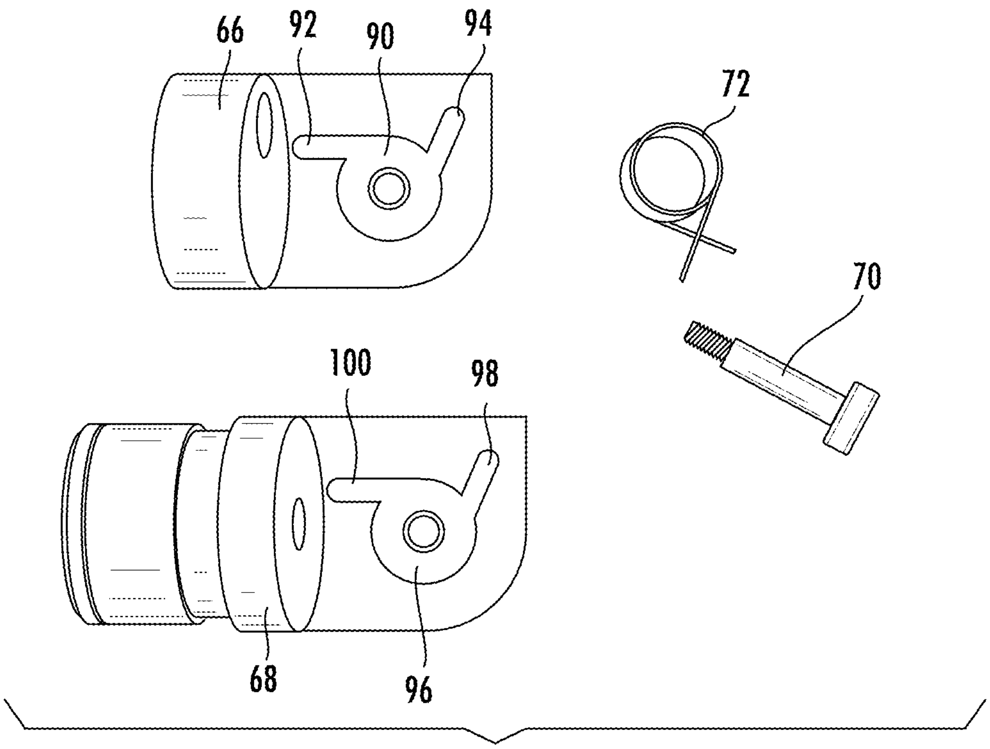
FIG. 13 shows certain components of a hinge that may be used in a gate apparatus of the present invention in a disassembled state.

It will be appreciated that proximal arm elements 34, 38 can be attached to hinge 22 in any suitable manner. Referring now particularly to FIGS. 10 through 12, the illustrated embodiment uses an expandible clamping mechanism 78 that secures second pivoting part 68 to the associated one of proximal arm elements 34, 38 without external connectors. In this regard, second pivoting part 68 has a frustoconical portion 80 forming its distal end. A split ring 82, here having a cylindrical shape, is seated on the frustoconical portion 80. A disc 84 having a threaded bore 86 engages the distal side of ring 82. A jacking bolt 88 extends through a hole defined in second pivoting part 68 into engagement with the threaded bore 86 of disc 84. As the jacking bolt 88 is tightened, bolt 88 and disc 84 pull ring 82 up the sloped surface of frustoconical portion 80. Ring 82 thus expands into firm engagement with the inner surface of proximal arm element 34, 38. As a result, pivoting part 66 and proximal arm element 34, 38 are securely connected to one another.

As described above, gate 10 is preferably mountable in either of two orientations, with the hinge parts 66 and 68 either being aligned with one another or perpendicular to one another when swingable structure 20 is in the closed position. It is desirable, however, that spring element 72 properly operate to be at least substantially at rest in either case. This can be achieved in a variety of ways, such as using different springs depending on the mounting orientation. (In any event, spring element 72 will preferably still be wound sufficiently to urge striker portion 26 against the adjacent fixed structure, e.g., railing element 14, to remain closed.)

Figure 14:
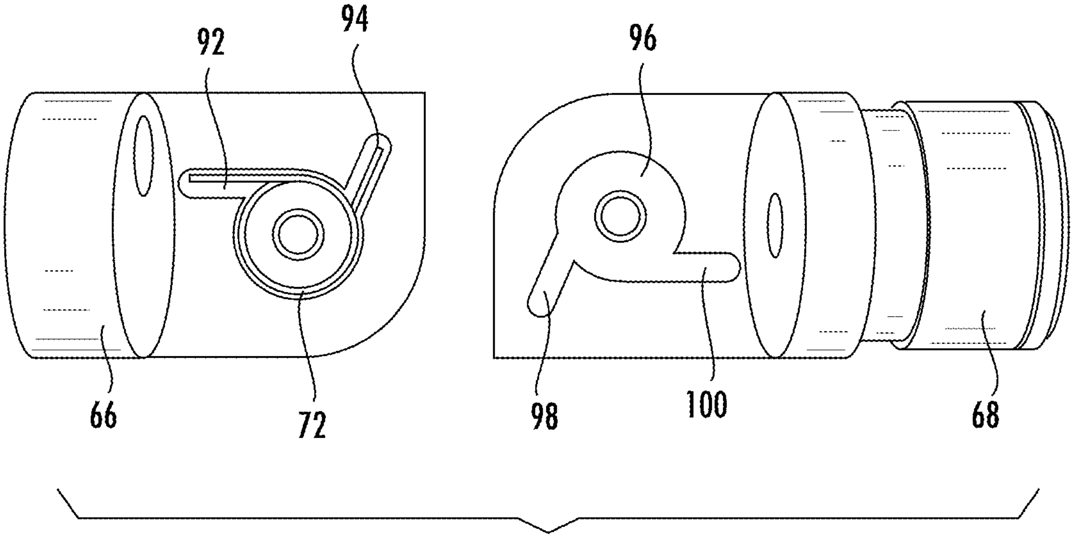
FIGS. 14 and 15 show the hinge parts of FIG. 14 in first and second spring orientations, respectively.
Figure 15:
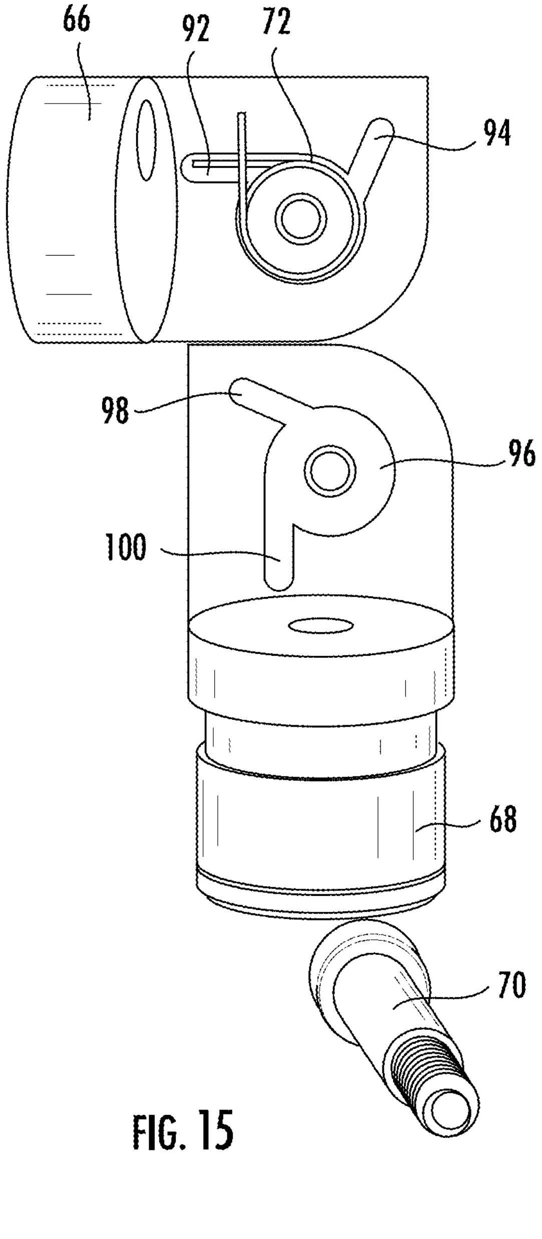

Referring now to FIGS. 14 and 15, the spring receiving space defined between pivoting parts 66 and 68 is configured in this embodiment to accept spring element 72 in two different orientations. Toward this end, pivoting part 66 defines a receptacle 90 in which the coil of the spring is received. A pair of tangential slots 92 and 94 extend from the receptacle 90. Similarly, pivoting part 68 defines a receptacle 96 in which the coil of the spring is received. A pair of tangential slots 98 and 100 extend from the receptacle 96. Together, receptacles 90 and 96 define the internal space in which the spring is enclosed. One end of the spring is seated in either of slots 92 or 94, with the other end of the spring being seated in either of slots 98 or 100, depending on the mounting configuration. If is desired to use the same spring in either mounting configuration, the spring may be rotated 90° in order to change the orientation.

It can thus be seen that the present invention provides a novel gate apparatus and various methods of using the same. Thus, while one or more preferred embodiments of the invention have been described above, it should be understood that any and all equivalent realizations of the present invention are included within the scope and spirit thereof. The embodiments depicted are presented by way of example only and are not intended as limitations upon the present invention. Moreover, it should be understood by those skilled in the art that the present invention is not limited to these embodiments since modifications can be made. Therefore, it is contemplated that any and all such embodiments are included in the present invention as may fall within the scope and spirit thereof.

The invention claimed is:

1. A gate apparatus comprising:

a mounting structure;

at least one hinge having a first pivoting part, a second pivoting part, and a spring element, the first pivoting part being attachable to the mounting structure;

a swingable structure attachable to the second pivoting part of the at least one hinge;

the first pivoting part and the second pivoting part defining an internal space in which the spring element is received so as to be entirely enclosed, the internal space being formed by opposed recesses defined in the first pivoting part and the second pivoting part; and wherein the internal space is configured to allow the spring element to be seated in the internal space in a selected one of a first orientation and a second orientation allowing the first pivoting part and the second pivoting part of the at least one hinge to be aligned or perpendicular when the swingable structure is in a closed position.

2. A gate apparatus as set forth in claim 1, wherein the spring element comprises at least one torsion spring.

3. A gate apparatus as set forth in claim 2, wherein the torsion spring has first and second end portions and at least one of the recesses defines first and second tangential slots to alternatively receive one of the end portions in the first orientation and the second orientation, respectively.

4. A gate apparatus as set forth in claim 3, wherein the at least one hinge comprises first and second hinges.

5. A gate apparatus as set forth in claim 4, wherein the swingable structure comprises first and second arms attached to the first and second hinges, respectively.

6. A gate apparatus as set forth in claim 5, wherein the first and second arms have a tubular configuration.

7. A gate apparatus as set forth in claim 6, further comprising a vertical element extending between the first and second arms.

8. A gate apparatus as set forth in claim 7, wherein the first and second arms each comprise a proximal arm element and a distal arm element telescopically received in the proximal arm element.

9. A gate apparatus as set forth in claim 6, wherein the second pivoting part of each of the first and second hinges are attached to an associated one of the first and second arms via a respective expandible clamping mechanism.

10. A gate apparatus as set forth in claim 9, wherein the expandible clamping mechanism utilizes a split ring.

11. A gate apparatus as set forth in claim 1, wherein said swingable structure is configured to have an adjustable width.

12. A gate apparatus comprising:

a mounting structure;

at least one hinge attachable to the mounting structure, the hinge having a first pivoting part and a second pivoting part that pivots relative to the first pivoting part via a hinge pin, the second pivoting part having a frustoconical portion forming a distal end of the second pivoting part; and a swingable structure attachable to the frustoconical portion of the second pivoting part via a respective expandible clamping mechanism, the swingable structure having at least one tubular arm, wherein the frustoconical portion of the second pivoting part causes expansion of the expandible clamping mechanism.

13. A gate apparatus as set forth in claim 12, wherein the expandible clamping mechanism includes a split ring engaging the frustoconical portion of the second pivoting part of the at least one hinge.

14. A gate apparatus comprising:

a mounting structure;

at least one hinge attachable to the mounting structure; and a swingable structure attachable to the at least one hinge via a respective expandible clamping mechanism, the swingable structure having at least one tubular arm, wherein the expandible clamping mechanism includes a split ring engaging a frustoconical portion of the at least one hinge, wherein the expandible clamping mechanism further comprises a jack screw and a disc engaging the split ring, wherein tightening of the jack screw causes expansion of the split ring.

15. A gate apparatus as set forth in claim 14, wherein the at least one hinge comprises first and second hinges respectively associated with first and second arms of the swingable structure.

16. A gate apparatus as set forth in claim 15, further comprising a vertical element extending between the first and second arms.

17. A gate apparatus as set forth in claim 16, wherein the first and second arms each comprise a proximal arm element and a distal arm element telescopically received in the proximal arm element.

18. A gate apparatus as set forth in claim 17, wherein the distal arm elements are portions of a U-shaped arm structure.

19. A gate apparatus comprising:

a mounting structure;

at least one hinge attachable to the mounting structure; and a swingable structure attachable to the at least one hinge;

the swingable structure having at least one tubular arm having a proximal arm element and a distal arm element telescopically received in the proximal arm element along an axis, the distal arm element being slidable with respect to the proximal arm element to adjust a width of the swingable structure; and a clamp configured to maintain the swingable structure at a selected width, the clamp having a first axial portion of greater inner diameter for engaging an exterior of the proximal arm element at a first axial location along the axis and a second axial portion of lesser inner diameter to engage an exterior of the distal arm element at a second axial location along the axis, the second axial location being different from but axially adjacent to the first axial location.

20. A gate apparatus as set forth in claim 19, wherein the clamp defines an axial gap between the first axial portion and the second axial portion, the gap separating the first axial location and the second axial location.

21. A gate apparatus comprising:

a mounting structure;

at least one hinge attachable to the mounting structure; and a swingable structure attachable to the at least one hinge;

the swingable structure having at least one tubular arm having a proximal arm element and a distal arm element telescopically received in the proximal arm element, the distal arm element being slidable with respect to the proximal arm element to adjust a width of the swingable structure; and a clamp configured to maintain the swingable structure at a selected width, the clamp having a first axial portion of greater inner diameter for engaging the proximal arm element and a second axial portion of lesser inner diameter to engage the distal arm element, wherein the clamp defines an axial gap between the first axial portion and the second axial portion, wherein each of the first axial portion and the second axial portion has a pair of opposed tabs defining aligned holes therethrough for receipt of a respective bolt.

22. A gate apparatus as set forth in claim 21, wherein:

the at least one hinge comprises first and second hinges;

the swingable structure comprises first and second arms attached to the first and second hinges, respectively; and a vertical element extends between the first and second arms.

23. A gate apparatus as set forth in claim 22, wherein the distal arm elements are portions of a U-shaped arm structure.

* * * * *